United States Patent
Gellert et al.

[11] Patent Number: 5,955,121
[45] Date of Patent: *Sep. 21, 1999

[54] INJECTION MOLDING APPARATUS WITH INSERT SECURED THROUGH THE MANIFOLD TO A NOZZLE

[75] Inventors: Jobst Ulrich Gellert, Georgetown; Denis L. Babin, Acton, both of Canada

[73] Assignee: Mold-Masters Limited, Georgetown, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/784,012

[22] Filed: Jan. 15, 1997

[30] Foreign Application Priority Data

Dec. 18, 1996 [CA] Canada ................... 2193327

[51] Int. Cl.$^6$ .................................. B29C 45/20
[52] U.S. Cl. ................ 425/549; 425/564; 425/570
[58] Field of Search ................... 425/549, 564, 425/566, 570

[56] References Cited

U.S. PATENT DOCUMENTS

| | | | |
|---|---|---|---|
| 4,740,151 | 4/1988 | Schmidt et al. | 425/549 |
| 4,932,858 | 6/1990 | Gellert | 425/564 |
| 5,366,369 | 11/1994 | Gellert . | |

FOREIGN PATENT DOCUMENTS

| | | |
|---|---|---|
| 2047461 | 1/1993 | Canada . |
| 0523549 | 1/1993 | European Pat. Off. . |

OTHER PUBLICATIONS

Copy of patent application 08/502922 filed Jul 17, 1995 to Gellert.

*Primary Examiner*—Tim Heitbrink
*Attorney, Agent, or Firm*—Dalesman & Company

[57] ABSTRACT

Multi-cavity injection molding apparatus having a number of heated nozzles extending from a melt distribution manifold. Each nozzle is aligned with a tapered insert seated in an opening extending through the manifold. Each insert has a melt duct with a smoothly curved bend to connect the melt passage in the melt distribution manifold with the melt bore through the nozzle. Each insert has a flat disc portion abutting against the rear surface of the manifold. Screws extend through this disc portion and the manifold into an outer collar portion of the nozzle to secure the insert and the aligned nozzle directly to the manifold, while allowing the nozzle to be mounted with its electrical terminal having a selected orientation.

10 Claims, 4 Drawing Sheets

INJECTION MOLDING APPARATUS WITH INSERT SECURED THROUGH THE MANIFOLD TO A NOZZLE

BACKGROUND OF THE INVENTION

This invention relates generally to injection molding and more particularly to multi-cavity apparatus having tapered inserts which are each secured in an opening through the melt distribution manifold by screws extending through the manifold into a heated nozzle, with the screws being angularly positioned to mount each heated nozzle with a selected orientation.

As seen in U.S. Pat. No. 4,740,151 to Schmidt et al which issued Apr. 26, 1988, it is known to have a valve gated injection molding system with a sealing bushing extending around each reciprocating valve member screwed in place against the rear surface of the melt distribution manifold. U.S. Pat. No. 4,932,858 to Gellert which issued Jun. 12, 1990 shows a valve gated injection molding system with a sealing bushing sealed in an opening extending through the multi-distribution manifold extending around each reciprocating valve member.

It is also known to have sprue gated injection molding systems with melt passage inserts seated in tapered openings in the melt distribution manifold in contact with the rear end of each nozzle. However, as seen in the applicants' European Patent Application Number 0 523 549 A2 published Jan. 20, 1993, these previous inserts are not secured directly to the nozzles. Thus, there has been the possibility of misalignment of the melt passage or melt leakage between the melt distribution manifold, the insert or the nozzle when high injection pressure is applied.

SUMMARY OF THE INVENTION

Accordingly it is an object of the present invention to at least partially overcome the disadvantages of the prior art by providing injection molding apparatus wherein each tapered insert, melt distribution manifold and aligned nozzle are secured directly together, while allowing the nozzle to be mounted with a selected orientation.

To this end, in one of its aspects, the invention provides multi-gate injection molding apparatus having a melt distribution manifold extending between a mold back plate and a plurality of spaced heated nozzles. The melt distribution manifold has a front surface and a rear surface, and the mold back plate has a front surface with an insulative air space extending between the rear surface of the melt distribution manifold and the front surface of the mold back plate. Each heated nozzle has a rear end, a front end, an elongated heated inner core portion, an outer collar portion encircling the inner core portion adjacent the rear end, and an electrical heating element with a terminal portion extending radially outward from the outer collar portion. The front surface of the melt distribution manifold abuts the rear ends of the nozzles. The inner core portion of each nozzle has a head at its rear end and a melt bore extending therethrough from the rear end to the front end. The outer core portion of each nozzle has a shoulder against which the head of the inner core portion abuts. A gate leads to a cavity adjacent the front end of each heated nozzle. A melt passage which receives melt at a common inlet branches in the melt distribution manifold to the melt bore through each heated nozzle to convey melt to the gates. A removable insert tapering inwardly towards the front is seated in a matching opening extending through the manifold in alignment with each nozzle. Each insert has a rearwardly extending portion, a front end, a tapered outer surface, and a melt duct extending therethrough. The rearwardly extending portion extends rearwardly into contact against the front surface of the mold back plate. The front end of the insert abuts against the rear end of the aligned nozzle. The melt duct has a smoothly curved bend and extends from an inlet on the outer surface to an outlet on the front end to form a portion of the melt passage. Each insert has an outwardly extending disc portion abutting against the rear surface of the manifold. A plurality of screws extend through holes in the disc portion of the insert, through aligned holes in the melt distribution manifold and into aligned holes in the collar portion of the aligned nozzle. This secures the insert in place in the tapered opening and secures the aligned heated nozzle to the melt distribution manifold with the rear end of the heated nozzle abutting against the front surface of the melt distribution manifold. The holes in the disc portion of the insert, the aligned holes in the melt distribution manifold and the aligned holes in the collar portion of the nozzle are angularly positioned to mount the heated nozzle with the terminal portion of the heating element extending outwardly in a selected orientation.

Further objects and advantages of the invention will appear from the following description taken together with the accompanying drawings.

DETAILED DESCRIPTION OF THE INVENTION

Figure 1:
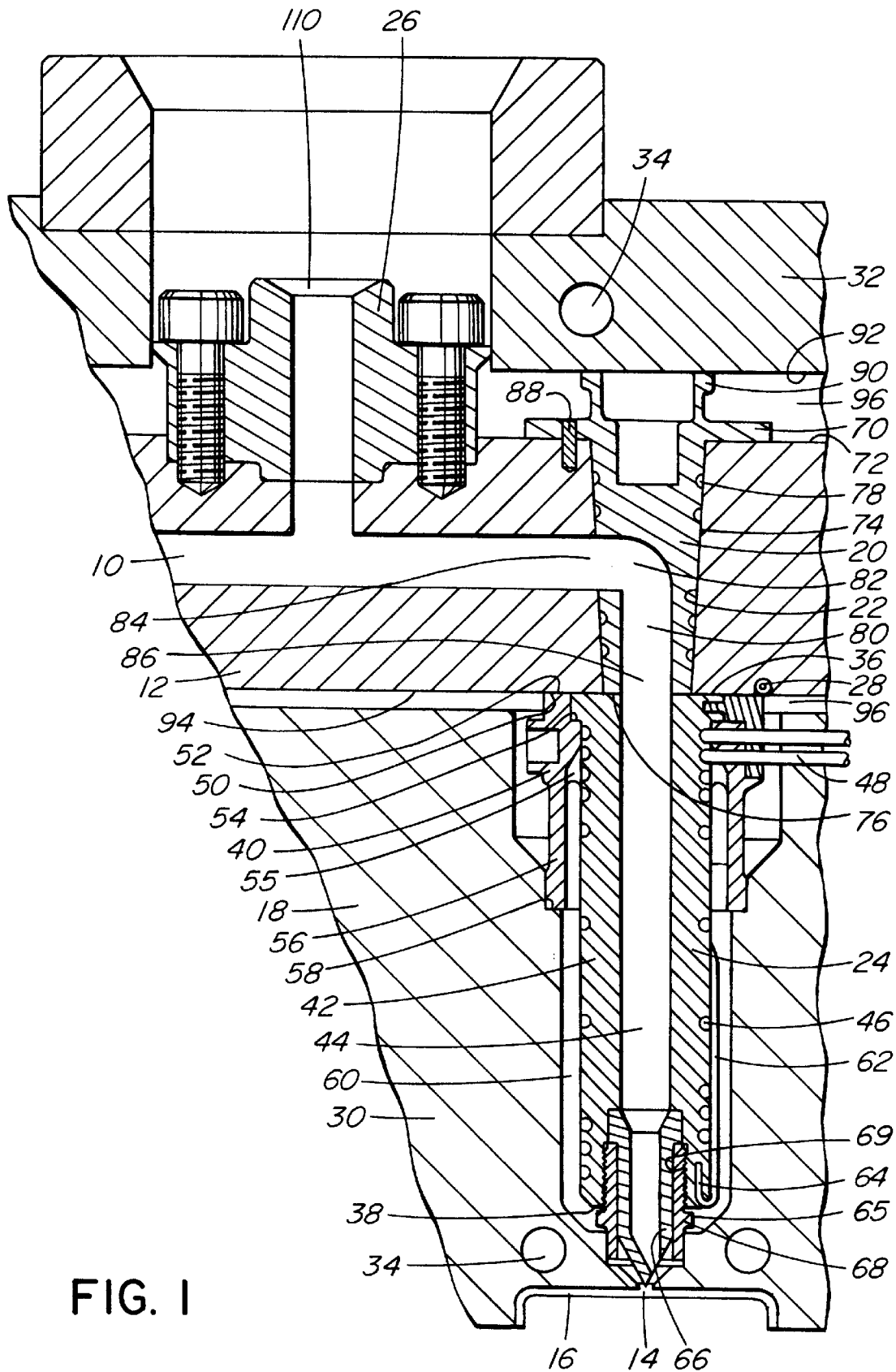
FIG. 1 is a sectional view of a portion of an injection molding system showing sprue gated apparatus according to one embodiment of the invention.
Figure 2:
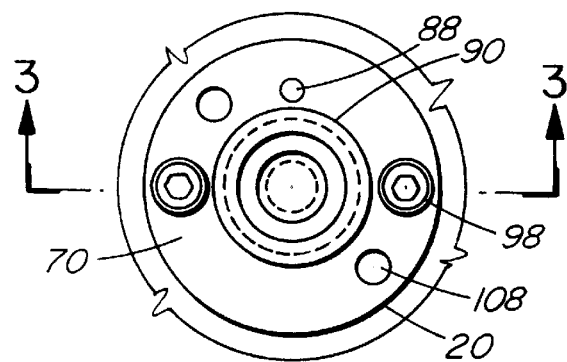
FIG. 2 is a plan view of the insert shown in FIG. 1.

Reference is first made to FIG. 1 which shows a portion of a multi-gate hot tip gated injection molding system or apparatus having a melt passage 10 which branches in a steel melt distribution manifold 12 to convey pressurized melt to several gates 14 leading to cavities 16 in a mold 18. The melt passage 10 extends through steel inserts 20 according to one embodiment of the invention. Each insert 20 is seated in a tapered opening 22 in the melt distribution manifold 12 in alignment with a heated nozzle 24 extending to one of the gates 14. The melt distribution manifold 12 has a cylindrical inlet portion 26 and is heated by an integral heating element 28. While the mold 18 usually has a greater number of plates depending upon the application, in this case only a cavity plate 30 and a back plate 32 which are secured together by screws (not shown) are shown for ease of illustration. The mold 18 is cooled by pumping cooling water through cooling conduits 34.

Each nozzle 24 has a rear end 36 and a front end 38, with an outer collar portion 40 encircling an elongated inner core portion 42 adjacent the rear end 36. The inner core portion 42 has a central melt bore 44 extending from the rear end 36 to the front end 38. The melt bore 44 is encircled by an electrical heating element 46 which has a terminal portion 48 extending radially outward from the outer collar portion 40 in a selected direction as described in more detail below. The outer collar portion 40 is normally made of H13 hot work steel, while the inner core portion 42 may be made of different materials such as aluminum, stainless steel or a beryllium copper or beryllium nickel alloy having different thermal characteristics depending upon the application. The inner core portion 42 has an outwardly extending head 50 which fits in a seat 52 in the outer collar portion 40 and abuts against an inwardly extending shoulder 54. The outer collar portion 40 and the inner core portion 42 are joined together by a thermosetting ceramic sealant 55. The outer collar portion 40 has a cylindrical skirt 56 which extends forwardly around the inner core portion 42 and is received in a circular seat 58 in the mold 18. This locates the heated nozzle 24 in the cooled mold 18 with an insulative air space 60 extending between them. A thermocouple element 62 extends through this air space 60 into a hole 64 at the front end 38 of the nozzle 24 to monitor the operating temperature. In this configuration, a nozzle seal 65 having a hollow inner piece 66 held in place by a threaded outer piece 68 screwed into a threaded seat 69 in the front end 38 of the nozzle 24 provides hot tip gating. However, the front ends 38 of the nozzles 24 can have various other configurations with different types of seals to provide different types of gating. The inner piece 66 is made of a highly thermally conductive material such as a tungsten carbide alloy and the outer piece 68 is made of a less conductive material such as a titanium alloy or stainless steel.

Each insert 20 has a flat disc portion 70 which abuts against the rear surface 72 of the melt distribution manifold 12. The outer surface 74 of the insert 20 tapers inwardly toward its front end 76 and fits in the tapered opening 22 through the melt distribution manifold 12. In this embodiment, the outer surface 74 of the insert has a number of circumferentially extending seepage grooves 78 to collect any melt seeping through between the insert 20 and the surrounding manifold 12. The insert 20 has a melt duct 80 with a smoothly curved bend 82 extending from an inlet 84 on its outer surface 74 to a central outlet 86 on its front end 76 which forms part of the melt passage 10. As can be seen, the diameter of the melt duct 80 extending through the insert 20 is the same as the diameter of the melt passage 10 in the manifold 12 and the central melt bore 44 through the nozzle 24 with which it is aligned. The front end 76 of the insert 20 abuts tightly against the rear end 36 of the nozzle 24 to ensure there is no melt leakage between them. A locating pin 88 extends from the insert 20 into the melt distribution manifold 12 to ensure the melt duct inlet 84 is accurately aligned with the melt passage 10 in the melt distribution manifold 12.

Each insert 20 also has a rearwardly extending portion 90 which extends rearwardly into contact against the front surface 92 of the mold back plate 32. This, together with the front surface 94 of the melt distribution manifold 12 abutting against the rear ends 36 of the nozzles 24 secures the heated manifold 12 in place with an insulative air space 96 extending between it and the surrounding cooled mold 18. While the rearwardly extending portion 90 of each insert is shown as a circular flange in this embodiment, in other embodiments it can have other shapes and sizes which are small enough to minimize heat loss, but strong enough to withstand clamped forces.

Figure 3:
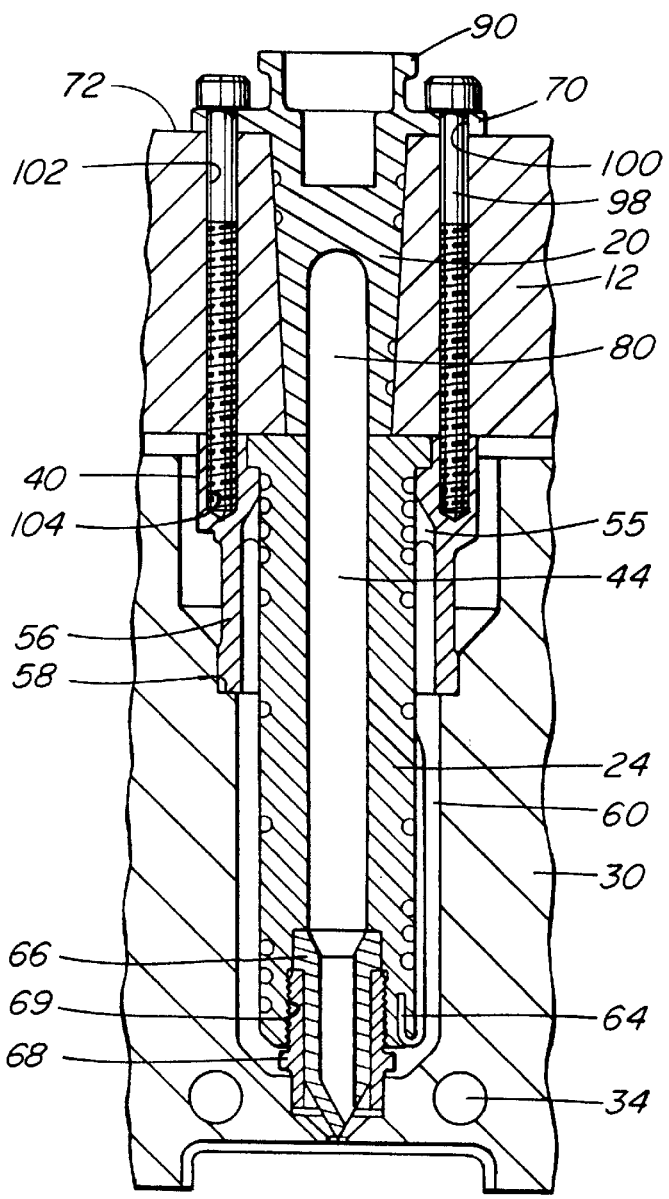
FIG. 3 is a sectional view taken along line 3—3 in FIG. 2.

As best seen in FIG. 3, the insert 20 and the aligned nozzle 24 are secured to the melt distribution manifold 12 by threaded screws 98 which extend through holes 100 in the disc portion 70 of the insert 20, through aligned holes 102 in manifold 12 into aligned threaded holes 104 in the collar portion 40 of the nozzle 24. The insert 20 having the disc portion 70 extending around it allows these holes 100, 102, 104 to be angularly positioned after the orientation of the nozzle 24 has been selected. In some applications it may be desirable to change the orientation of the melt duct inlet 84 to match a different direction of the melt passage 10 in the melt distribution manifold 12. In some applications it may be desirable to change the orientation of the terminal portion 48 of the nozzle 24. In a typical multi-gate configuration having a row or rows of nozzles 24 close together, it is often necessary to have the terminal portions 48 of the nozzles 24 extending in different directions to make room for them all. Having the circular disc portion 70 allows the holes 100, 102 and 104 to be drilled in positions which will extend into the outer collar portion 40 of the nozzles 24 without hitting the terminal portion 48 in any case. Tightening the screws 98 into place secures each insert 20 in place in the tapered opening 22 in the melt distribution manifold 12 with the inlet 84 of the melt duct in accurate alignment with the melt passage 10. As can be seen, having the screws 98 extend through the melt distribution manifold 12 into the outer collar portion 40 of the nozzle ensures that the inner core portion 42 and outer collar portion 40 of the nozzle 24 are held securely together and also that the rear end 36 of the nozzle 24 is secured tightly against the front end 76 of the insert 20 to withstand pressures up to 30,000 psi without melt leakage.

Figure 4:
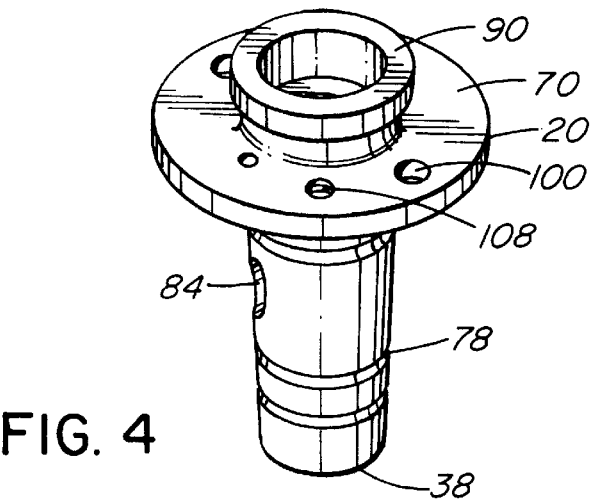
FIG. 4 is an isometric view of the insert shown in the above Figures.
Figure 5:
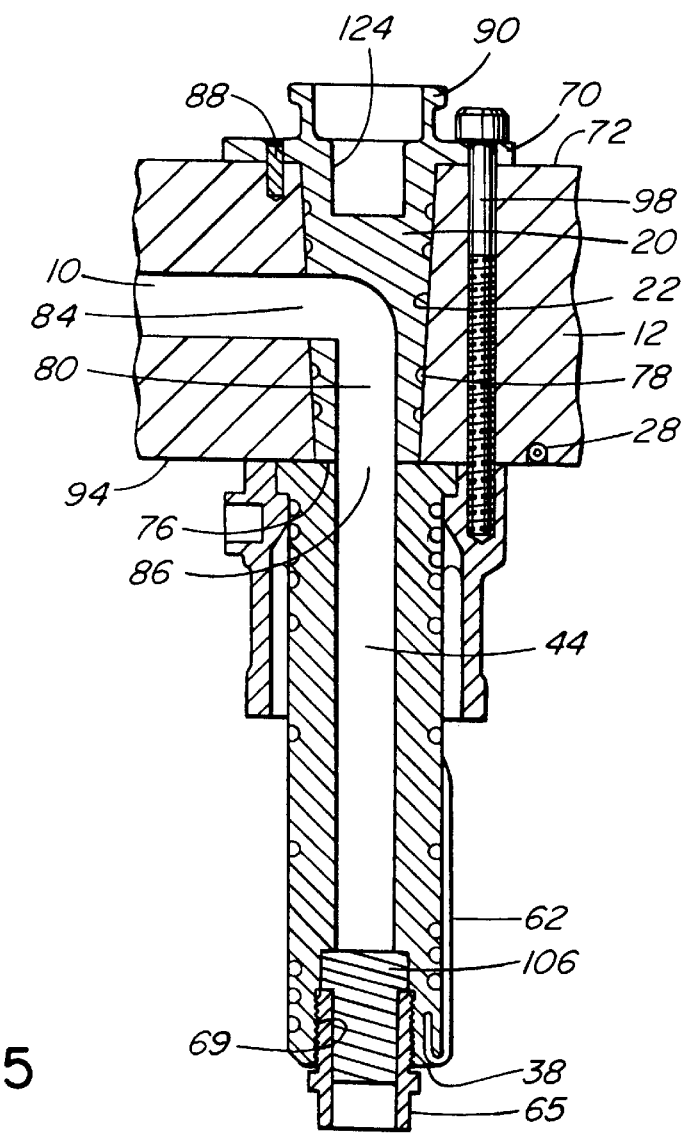
FIG. 5 is another sectional view showing how the above apparatus is pressure tested.

Securing the inserts 20, melt distribution manifold 12 and the nozzles 24 together using screws 98 also provides the advantage that the melt passage 10 can be pressure tested for leaks by the manufacturer before shipping to the customer for mounting in the mold 18. As seen in FIG. 5, this is done by replacing the inner pieces 66 of the nozzle seals 65 by removable plugs 106 and then applying the necessary hydraulic pressure. As seen in FIG. 4, the circular disc portion 70 of each insert 20 also has rearwardly open threaded holes 108 to receive a removal jack (not shown) to withdraw the insert 20 from the tapered opening 22 during disassembly.

In use, the injection molding system is assembled as shown in FIG. 1. While only a single cavity 16 has been shown for ease of illustration, it will be appreciated that the melt distribution manifold 12 normally has many more melt passage branches extending to numerous cavities 16 depending on the application. Electrical power is applied to the heating element 28 in the melt distribution manifold 12 and to the heating elements 46 in the nozzles 24 to heat them to a predetermined operating temperature. Hot pressurized melt is then injected from a molding machine (not shown) into the melt passage 10 through a central inlet 110 according to a predetermined injection cycle. The melt flows through the melt duct 80 in each of the inserts 20 and through the melt bore 44 in each of the nozzles 24 to the gates 14. After the cavities 16 are filled and a suitable packing and cooling period has expired, the injection pressure is released and the melt conveying system is decompressed to avoid stringing through the open gates 14. The mold 18 is then opened to eject the molded products. After ejection, the mold 18 is closed and the cycle is repeated continuously with a cycle time dependent upon the size of the cavities 16 and the type of material being molded.

Figure 7:
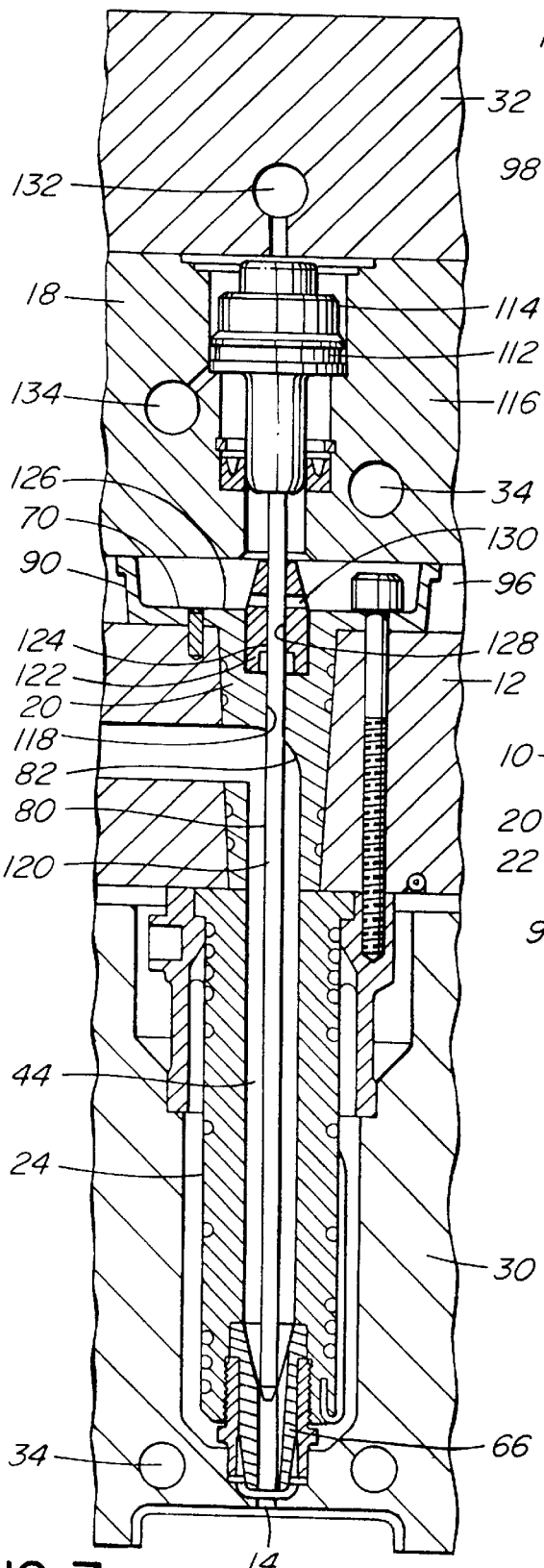
FIG. 7 is a sectional view taken along line 7—7 in FIG. 6.
Figure 6:
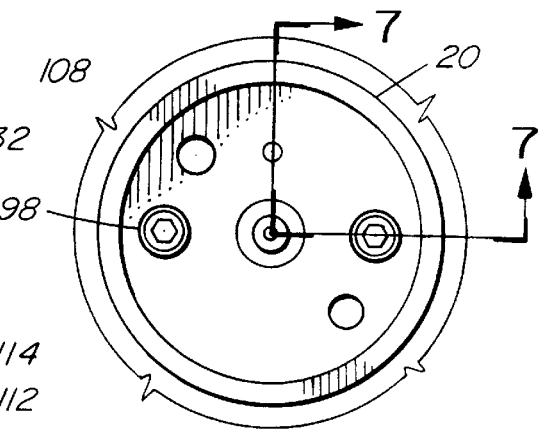
FIG. 6 is a plan view of an insert according to another embodiment of the invention.
Figure 8:
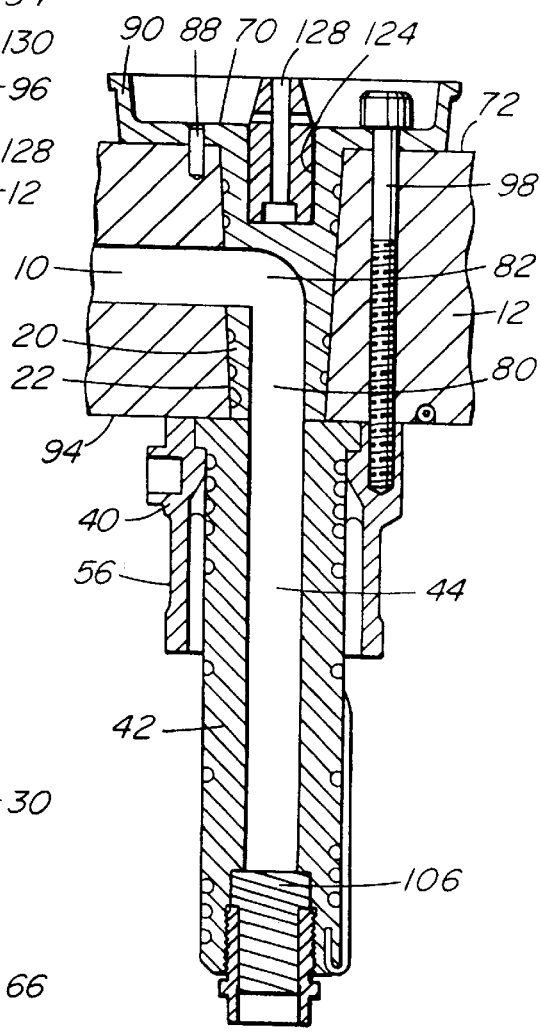
FIG. 8 is a similar sectional view showing how the apparatus in FIG. 7 is pressure tested.

Reference is now made to FIGS. 6–8 which show a valve gated injection molding system according to another embodiment of the invention. As many of the elements are the same as described above, elements common to both embodiments are described and illustrated using the same reference numerals as before. In this case, pistons 112 are mounted in cylinders 114 in a cylindrical plate 116 extending between the melt distribution manifold 12 and the back plate 32. Each insert 20 has a central bore 118 extending rearwardly from the curved bend 82 of the melt duct 80 through which an elongated valve member 120 extends forwardly from one of the pistons 112 into the melt duct 80 and the central melt bore 44 of the nozzle 24. Each insert 20 also has a sealing bushing 122 made of a high wear resistant material seated in a matching seat 124 in its rear end 126. The sealing bushing 122 has a central bore 128 aligned with the central bore 118 in the insert. Both bores 118, 128 are made to fit around the valve member 120 to prevent melt leakage and in this case the sealing bushing 120 has a set of seepage and venting holes 130 extending around it to collect any seepage.

In this embodiment, the flat disc portion 70 of each insert is inside rather than outside the rearwardly extending circular flange 90. As described above, the circular flanges 90 of the inserts 20 extend rearwardly into contact with the mold 18 to secure the heated melt distribution manifold 12 in place, but in this case, each circular flange 90 also provides a seal in case any melt escapes from around the valve member 120. Each valve member 120 is connected to one of the pistons 112 in the cylinder 114. Controlled hydraulic pressure is applied to opposite sides of the piston 112 through ducts 132, 134 extending through the back plate 32 and the cylinder plate 116 to reciprocate the valve member 120 between a retracted open position and a forward closed position in which the front tip end 136 of the valve member 120 is seated in the gate 14. While hydraulic actuating mechanisms are shown for ease of illustration, of course, pneumatic actuating mechanisms are used for many applications. As seen in FIG. 8, pressure testing of the melt passage 10 is done before the central bores 118 are drilled through the inserts 20. As described above, this is done by the manufacturer replacing the inner pieces 66 of the nozzle seals 65 by removable plugs 106 and then applying the necessary hydraulic pressure. Use of this embodiment is the same as that described above except that, of course, controlled hydraulic pressure is applied to the cylinders 114 to control actuation of the pistons 112 and valve members 120 according to the injection cycle in a conventional manner.

While the description of the apparatus with each tapered insert, melt distribution manifold and aligned nozzle secured directly together, while allowing the nozzle to be mounted with a selected orientation has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In a multi-gate injection molding apparatus having a melt distribution manifold extending between a mold back plate and a plurality of spaced heated nozzles, the melt distribution manifold having a front surface and a rear surface and the mold back plate having a front surface with an insulative air space extending between the rear surface of the melt distribution manifold and the front surface of the mold back plate, each heated nozzle having a rear end, a front end, an elongated inner core portion, an outer collar portion encircling the inner core portion adjacent the rear end, and an electrical heating element with a terminal portion extending radially outward from the outer collar portion, the front surface of the melt distribution manifold abutting the rear ends of the nozzles, the inner core portion of each nozzle having a head at the rear end and a melt bore extending therethrough from the rear end to the front end, the outer core portion of each nozzle having a shoulder against which the head of the inner core portion abuts, a gate leading to a cavity adjacent the front end of each heated nozzle, a melt passage which receives melt at a common inlet and branches in the melt distribution manifold to the melt bore through each heated nozzle to convey melt to the gates, a removable insert in alignment with each nozzle, each insert having a rearwardly extending portion and a front end, the rearwardly extending portion extending rearwardly into contact against the front surface of the mold back plate, a melt duct extending from an inlet on an outer surface of the insert to an outlet on the front end thereof to form a portion of the melt passage, the improvement further comprising:

each insert having an outwardly extending flat disc portion abutting against the rear surface of the manifold, a plurality of screws extending through holes in the disc portion of the insert, through aligned holes in the melt distribution manifold and into aligned holes in the collar portion of the aligned nozzle to secure the insert in place and secure the aligned heated nozzle to the melt distribution manifold with the rear end of the heated nozzle abutting against the front surface of the melt distribution manifold, whereby the holes in the disc portion of the insert, the aligned holes in the melt distribution manifold and the aligned holes in the collar portion of the nozzle are angularly positioned to mount the heated nozzle with the terminal portion of the heating element extending outwardly in a selected orientation, and each insert having a tapered outer surface (74) which tapers inwardly toward the front end (76) thereof so as to form a tapered portion which is fitted into a correspondingly tapered opening (22) in manifold (12), said insert having in the tapered portion a melt duct (80) consisting of a single smooth curved bend (82) which extends from an inlet (84) to a central inlet (86) at front end (76), which said bend forms part of the melt passage (10).

2. Injection molding apparatus as claimed in claim 1 wherein the rearwardly extending flat disc portion has a circular flange.

3. Injection molding apparatus as claimed in claim 2 wherein the flat disc portion of each insert extends outwardly past the circular flange portion.

4. Injection molding apparatus as claimed in claim 1, wherein the front end (38) of the nozzle (24) has means for receiving a plug (106) in the melt bore (44) whereby hydraulic pressure may be applied to melt passage (10) to pressure test for leaks thereof.

5. Injection molding apparatus as claimed in claim 4, wherein an inner piece (66) of a nozzle seal (65) is removed from front end (38) and the plug (106) is secured in a threaded outer piece (68).

6. Injection molding apparatus as claimed in claim 1, wherein the disc portion (70) of insert (20) has rearwardly open threaded holes (108) to receive a removal jack for withdrawing tapered insert (20) from tapered opening (22) during disassembly thereof.

7. Injection molding apparatus as claimed in claim 1 wherein a valve member extends through the insert to the gate and includes a front tip end extending in alignment with each gate and valve member actuating mechanism to reciprocate each valve member between a retracted open position and a forward closed position wherein the front tip end is seated in the aligned gate, wherein each insert has a central bore through which one of the valve members fits extending therethrough rearwardly from the curved bend of the melt duct.

8. Injection molding apparatus as claimed in claim 7 wherein each insert has a sealing bushing securely received in a seat extending around the central bore at the rear end of the insert, the sealing bushing having a central bore through which the valve member extends, the valve member fitting in the central bore in the insert and in the central bore through the sealing bushing to substantially prevent melt leakage around the reciprocating valve member.

9. Injection molding apparatus of claim 7, wherein insert (20) has a sealing bushing (122) seated in matching seat (124) at its rear end (126).

10. Injection molding apparatus of claim 9, wherein the sealing bushing (122) has a central bore (128) aligned with a central bore (118) of insert (20).

* * * * *